United States Patent [19]
Hirose

[11] Patent Number: 5,994,874
[45] Date of Patent: Nov. 30, 1999

[54] BATTERY CHARGING SYSTEM WITH BATTERY PACK OF DIFFERENT CHARGING VOLTAGES USING COMMON A BATTERY CHARGER

[75] Inventor: Toshinori Hirose, Saitama, Japan

[73] Assignee: NEC Corporation, Tokyo, Japan

[21] Appl. No.: 09/078,449

[22] Filed: May 13, 1998

[30] Foreign Application Priority Data

May 13, 1997 [JP] Japan .................................... 9-122472

[51] Int. Cl.⁶ ........................................................ H02J 7/00
[52] U.S. Cl. ............................ 320/125; 320/162; 320/160
[58] Field of Search ..................................... 300/160, 162, 300/125

[56] References Cited

U.S. PATENT DOCUMENTS

| | | | |
|---|---|---|---|
| 5,237,259 | 8/1993 | Sanpei | 320/158 |
| 5,363,030 | 11/1994 | Ford et al. | 320/127 |
| 5,561,361 | 10/1996 | Sengupta et al. | 320/152 |
| 5,572,110 | 11/1996 | Dunstan | 320/106 |

FOREIGN PATENT DOCUMENTS

| | | |
|---|---|---|
| 0 800 253 A2 | 3/1997 | European Pat. Off. . |
| 6-52902 | 2/1994 | Japan . |
| 9-121462 | 5/1997 | Japan . |
| 2 307 804 | 6/1997 | United Kingdom . |
| 2 313 497 | 11/1997 | United Kingdom . |
| 2 315 171 | 1/1998 | United Kingdom . |

*Primary Examiner*—Peter S. Wong
*Assistant Examiner*—Gregory J. Toatley
*Attorney, Agent, or Firm*—Scully, Scott, Murphy & Presser

[57] ABSTRACT

A rechargeable battery pack includes a rechargeable battery having a predetermined charge voltage, and a circuit for generating a control voltage depending on a battery voltage of the rechargeable battery so that the control voltage reaches a predetermined control voltage when the battery voltage reaches a predetermined charge voltage of the rechargeable battery. A battery charger for the rechargeable battery changes the charging control from constant-current to constant-voltage depending on whether the control voltage reaches the predetermined control voltage.

20 Claims, 4 Drawing Sheets

BATTERY CHARGING SYSTEM WITH BATTERY PACK OF DIFFERENT CHARGING VOLTAGES USING COMMON A BATTERY CHARGER

BACKGROUND OF THE INVENTION

1. Field of the Invention

The present invention generally relates to a battery charging system, and in particular to a system for charging a rechargeable battery such as a lithium-ion battery and a rechargeable battery pack for use in the system.

2. Description of the Related Art

Recently, a rechargeable battery or a secondary battery has been widely used as a power supply for portable or hand-held electronic equipment in consideration of running costs. Such a rechargeable battery has predetermined charging conditions including charging current and time. Especially in the case of a rechargeable lithium-ion battery, the details about charging conditions have been defined.

In general, a constant-voltage and constant-current charging method is used to charge a rechargeable lithium-ion battery. More specifically, the rechargeable lithium-ion battery is charged with a constant current until the battery voltage has risen to a predetermined charge control voltage and thereafter with a constant voltage. Such a charging method has been disclosed in U.S. Pat. No. 5,237,259, for example.

There has been commercially available rechargeable lithium-ion batteries having different prescribed voltages. Therefore, it is necessary for a single battery charger to provide a plurality of charge control voltages each corresponding to the prescribed voltage of a rechargeable lithium-ion battery. To cope with this, the battery charger may be provided with a plurality of constant-voltage circuits which are selectively used depending on the type of a rechargeable lithium-ion battery pack. The battery charger is further provided with a battery type identifying means. And the rechargeable lithium-ion battery pack is provided with a battery type indicating means. When the battery pack is electrically connected to the battery charger, the battery type identifying means of the battery charger identifies the type of the lithium-ion battery by checking the battery type indicating means of the battery pack. According to the battery type, the battery charger provides the corresponding constant voltage to the battery pack after the battery voltage has risen to the predetermined charge control voltage.

However, the rechargeable lithium-ion battery pack needs the battery type indicating means and the charger needs the battery type identifying means. Therefore, it is difficult to miniaturizing the size and weight of the batter charging system as well as the battery pack.

SUMMARY OF THE INVENTION

An object of the present invention is to provide a battery charging system which can cope with a plurality of battery types with reduced amount of hardware.

Another object of the present invention is to provide a rechargeable battery pack which can be charged without the need of changing a battery charger depending on its battery type.

According to the present invention, a battery charging system includes a battery charger and a plurality of rechargeable battery packs each having a different predetermined charge voltage. Each of the rechargeable battery packs includes a rechargeable battery having a predetermined charge voltage, and a circuit for generating a control voltage depending on a battery voltage of the rechargeable battery so that the control voltage reaches a predetermined control voltage when the battery voltage reaches a predetermined charge voltage of the rechargeable battery. The battery charger charges the rechargeable battery depending on the control voltage received from a rechargeable battery connected thereto.

Since the circuit of each rechargeable battery pack generates the control voltage such that the control voltage reaches the predetermined control voltage when the battery voltage reaches the predetermined charge voltage of the rechargeable battery, the battery charger can cope with the plurality of rechargeable battery packs each having a different predetermined charge voltage in other words, since the predetermined control voltage is set to a single common voltage among the rechargeable battery packs, the battery charger can charge any one of the different rechargeable battery packs.

DETAILED DESCRIPTION OF THE PREFERRED EMBODIMENTS

Figure 1:
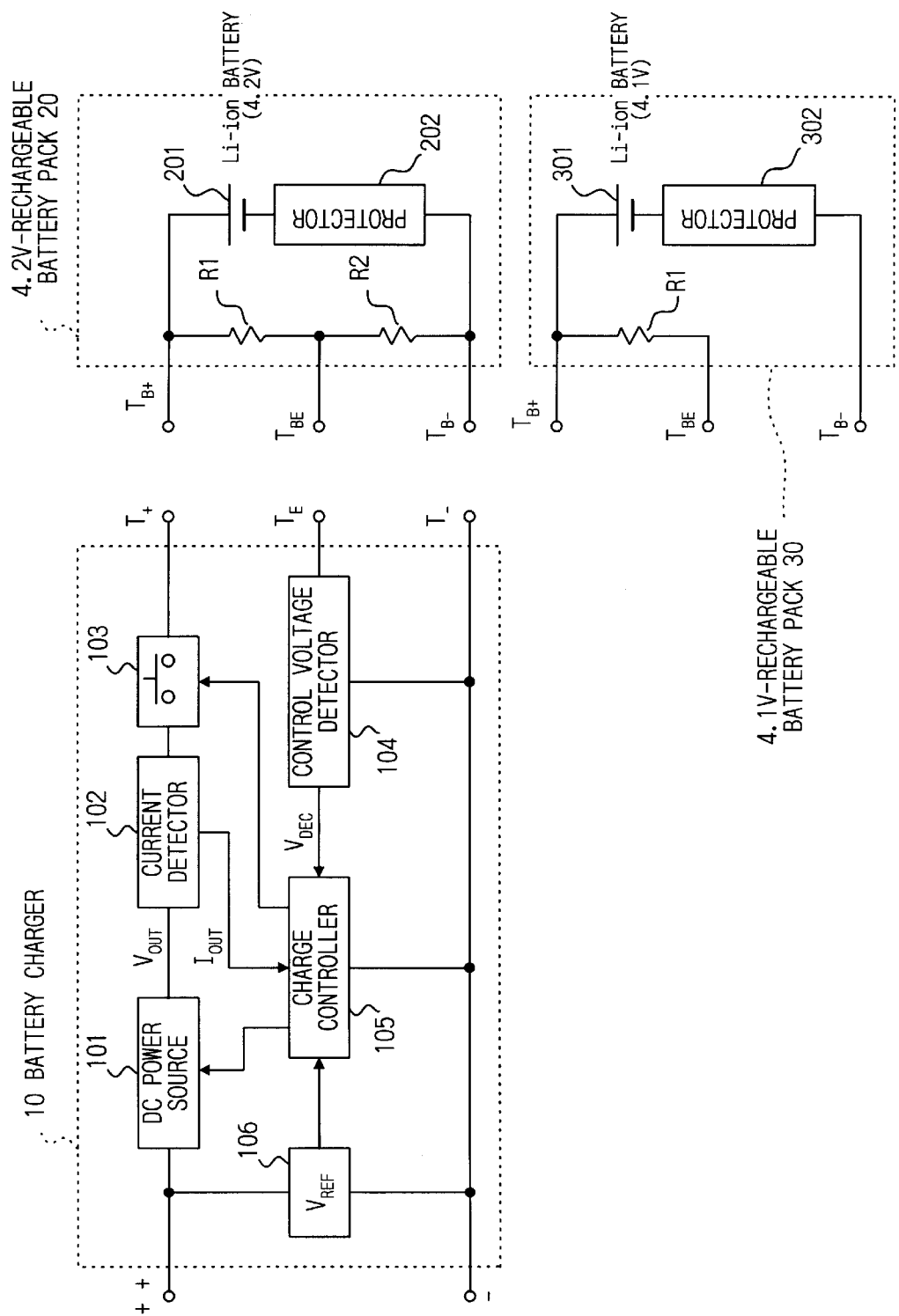
FIG. 1 is a block diagram showing a battery charging system according to a first embodiment of the present invention.

Referring to FIG. 1, a battery charging system according to a first embodiment of the present invention is comprised of a battery charger 10 which is provided with a connection surface having power supply terminals $T_+$ and $T_-$ and a control voltage detection terminal $T_{E-}$. The battery charger 10 can be connected to one of a plurality of rechargeable battery packs including rechargeable lithium-ion batteries of different prescribed charge voltages, respectively. Each of rechargeable battery packs is provided with a connection surface having power receive terminals $T_{B+}$ and $T_{B-}$ and a control voltage supply terminal $T_{BE}$ which correspond to the power supply terminals $T_+$ and $T_-$ and the voltage detection terminal $T_E$, respectively.

BATTERY CHARGER

The battery charger 10 may use a widely-used lithium-ion battery charger which can provide a constant current until the control voltage reaches a predetermined voltage and thereafter keep the output voltage at a voltage appearing on the power supply terminal $T_+$ at that time.

For example, as shown in FIG. 1. the battery charger 10 includes a DC power source 101 which inputs a DC power applied on power input terminals as indicated by '++' and '−' and generates an output voltage $V_{OUT}$ with limited current $I_{OUT}$. The output current $I_{OUT}$ is detected by a current detector 102. The output voltage $V_{OUT}$ with limited current $I_{OUT}$ is output to the power supply terminals $T_+$ and $T_-$ through an on-off switch 103.

The control voltage detection terminal $T_E$ is connected to a control voltage detector 104 which detects a control voltage $V_{DEC}$ of a connected rechargeable battery pack. A charge controller 105 performs the charge control of the connected rechargeable battery pack using the detected output current $I_{OUT}$ the detected control voltage $V_{DEC}$ and a reference voltage input from a reference voltage generator 106. As will be described later, the charge controller is set to a single predetermined control voltage $V_{VC}$, for example, $V_{CV}=4.1$ V which may be the lowest prescribed battery voltage among the lithium-ion batteries.

More specifically, when a rechargeable battery pack is connected, the charge controller 105 performs constant-current charging control of the DC power source 101 based on the detected output current $I_{OUT}$ until the detected control voltage $V_{DEC}$ reaches the predetermined control voltage $V_{CV}$. When the detected control voltage $V_{DEC}$ has reached the predetermined control voltage $V_{CV}$, the charge controller 105 changes the charging control of the DC power source 101 from constant-current to constant-voltage. When the constant-voltage charging control is started, the DC power source 101 keeps the current output voltage $V_{OUT}$ constant.

In this manner, the battery charger 10 provide a constant current until the control voltage $V_{DEC}$ reaches the predetermined control voltage $V_{CV}$, and thereafter performs the constant-voltage charging control with keeping the output voltage $V_{OUT}$ constant and with the output current $I_{OUT}$ gradually decreasing.

It should be noted that the charge controller 105 changes the charging control from constant-current to constant-voltage by checking to see only whether the detected control voltage $V_{DEC}$ reaches the predetermined control voltage $V_{CV}$.

RECHARGEABLE BATTERY PACKS

For simplicity, two rechargeable battery packs are shown in FIG. 1: 4.2 V-rechargeable battery pack 20 and 4.1 V-rechargeable battery pack 30.

The 4.2 V-rechargeable battery pack 20 includes a rechargeable lithium-ion battery 201 of the prescribed charge voltage of 4.2 V. The rechargeable lithium-ion battery 201 is connected to the power receive terminals $T_{B+}$ and $T_{B-}$ through a protector 202.

Further, the power receive terminals $T_{B+}$ and $T_{B-}$ are electrically connected through a voltage divider comprising two resistors R1 and R2 connected in series. The control voltage supply terminal $T_{BE}$ is electrically connected to a tap of the voltage divider Therefore, the tap voltage is represented by $V_{BC} \times R2/(R1+R2)$, where $V_{BC}$ is a voltage across the lithium-ion battery 201 during charging. In other words, the tap voltage is lower than the current battery voltage $V_{BC}$ by a voltage drop of $V_{BC} \times R1/(R1+R2)$. Therefore, by setting the resistance ratio of the voltage divider to R1:R2=1:41, a voltage of 4.1 V appears on the control voltage supply terminal $T_{BE}$ when the battery voltage $V_{BC}$ across the rechargeable lithium-ion battery 201 reaches 4.2 V.

Practically, in consideration of tolerance of a resistance, temperature and time-varying characteristics of the resistors R1 and R2, a chip-type thin-film resistor may be used for the resistors R1 and R2. Further, to reduce in the current flowing through the voltage divider, in this embodiment, the following resistors are selected: R1=16.5 kΩ and R2=680 kΩ.

The 4.1 V-rechargeable battery pack 30 includes a rechargeable lithium-ion battery 301 of the prescribed charge voltage of 4.1 V. The rechargeable lithium-ion battery 301 is connected to the power receive terminals $T_{B+}$ and $T_{B-}$ through a protector 302.

Further, the control voltage supply terminal $T_{BE}$ is electrically connected to the power receive terminal $T_{B+}$ through a resistor R1 of 16.5 kΩ in this embodiment. Since the battery voltage $V_{BC}$ across the rechargeable lithium-ion battery 301 appears on the control voltage supply terminal $T_{BC}$, a voltage of 4.1 V appears on the control voltage supply terminal $T_{BE}$ when the battery voltage $V_{BC}$ across the rechargeable lithium-ion battery 301 reaches 4.1 V.

Therefore, as described above, in the case where the battery voltage $V_{BC}$ across the rechargeable lithium-ion battery 201 reaches 4.2 V and the battery voltage $V_{BC}$ across the rechargeable lithium-ion battery 301 reaches 4.1 V, the same voltage of 4.1 V appears on the control voltage supply terminal $T_{BE}$ of each rechargeable battery pack. As described before, in this embodiment, the charge controller 105 is set to the predetermined control voltage $V_{CV}=4.1$ V at which the charging control is changed from constant-current to constant-voltage. The charging control operation will be described hereinafter.

CHARGING CURRENT AND VOLTAGE

Figure 2A:
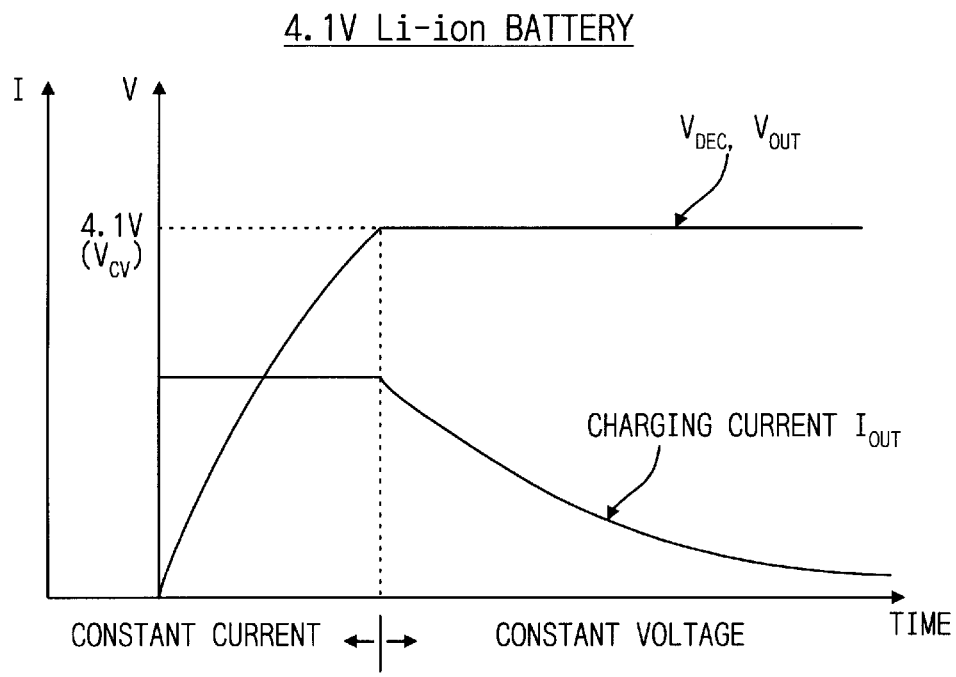
FIG. 2A is a graph illustrating time-varying charging voltage and current in the case where a 4.1 V Li-ion battery pack is connected to a battery charger of the battery charging system of FIG. 1.

As shown in FIG. 2A, in the case where the 4.1 V Li-ion battery pack 30 is connected to the battery charger 10, the charge controller 105 performs the constant-current charging control of the DC power source 101 by monitoring the detected output current $I_{OUT}$. The constant-current charging control causes the DC power source 101 to supply the constant current $I_{OUT}$ to the 4.1 V Li-ion battery 301 with gradually increasing in the output voltage $V_{OUT}$ or the charging battery voltage $V_{BC}$ across the rechargeable lithium-ion battery 301. Since the battery voltage $V_{BC}$ appears on the control voltage supply terminal $T_{BE}$, the detected control voltage $V_{DEC}$ is also equal to the output voltage $V_{OUT}$. Therefore, when the detected control voltage $V_{DEC}$ reaches the predetermined control voltage $V_{CV}=4.1$ V, the charge controller 105 changes the charging control of the DC power source 101 from constant-current to constant-voltage. When the constant-voltage charging control is started, the DC power source 101 keeps the current output voltage $V_{OUT}$ at the predetermined control voltage $V_{CV}=4.1$ V. In this charging state, the output current $I_{OUT}$ gradually decreases as shown in FIG. 2A.

Figure 2B:
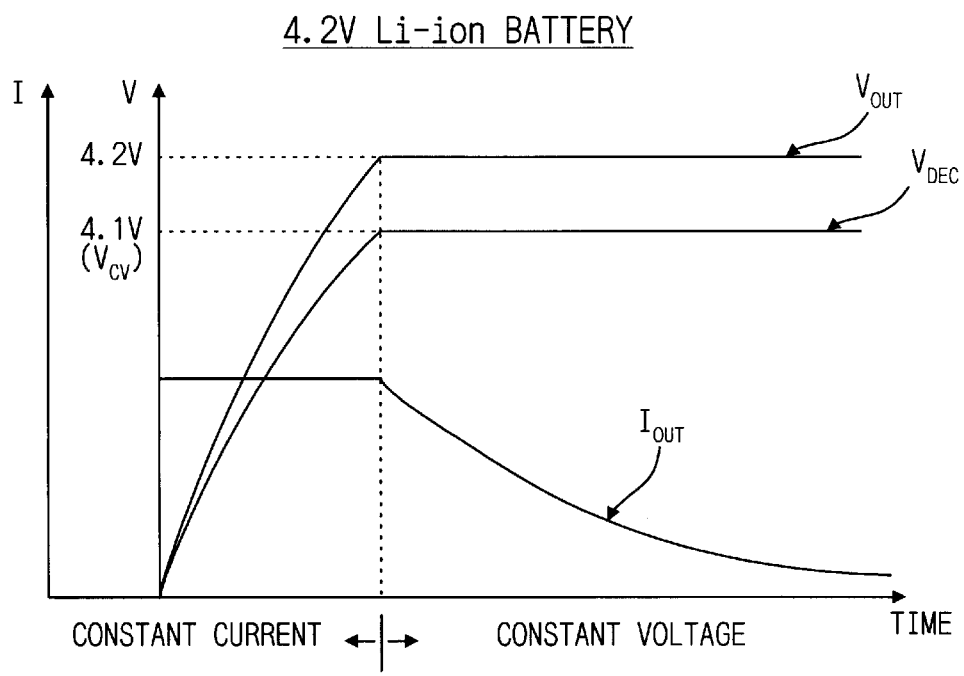
FIG. 2B is a graph illustrating time-varying charging voltage and current in the case where a 4.2 V Li-ion battery pack is connected to the battery charger of FIG. 1.

As shown FIG. 2B, in the case where the 4.2 V Li-ion battery pack 20 is connected to the battery charger 10, the charge controller 105 performs the constant-current charging control of the DC power source 101 by monitoring the detected output current $I_{OUT}$. The constant-current charging control causes the DC power source 101 to supply the constant current $I_{OUT}$ to the 4.2 V Li-ion battery 301 with gradually increasing in the output voltage $V_{OUT}$ or the charging battery voltage $V_{BC}$ across the rechargeable lithium-ion battery 201.

Since the respective resistors R1 and R2 of the voltage divider are set to R1=16.5 kΩ and R2=680 kΩ and the resistance ratio R1/R2 is approximately 1/41, the detected control voltage $V_{DEC}$ is lower than the output voltage $V_{OUT}$ by a voltage drop of $V_{OUT} \times R1/(R1+R2)$ as shown in FIG. 2B. Therefore, when the output voltage $V_{OUT}$ reaches 4.2 V. the detected control voltage $V_{DEC}$ reaches the predetermined control voltage $V_{CV}=4.1$ V. In other words, when the output voltage $V_{OUT}$ reaches 4.2 V, the charge controller 105 changes the charging control of the DC power source 101 from constant-current to constant-voltage. When the constant-voltage charging control is started, the DC power source 101 keeps the current output voltage $V_{OUT}$ at 4.2 V and the output current $I_{OUT}$ gradually decreases as shown in FIG. 2B.

As shown in FIGS. 2A and 2B, in the case where the output voltage $V_{OUT}$ of the 4.2 V-rechargeable battery pack 20 reaches 4.2 V and the output voltage $V_{OUT}$ of the 4.1 V-rechargeable battery pack 30 reaches 4.1 V, the same voltage of 4.1 V appears on the control voltage supply terminal $T_{BE}$ of each rechargeable battery pack. When the detected control voltage $V_{DEC}$ reaches the predetermined control voltage $V_{CV}$=4.1 V, the charge controller 105 changes the charging control from constant-current to constant-voltage. Therefore, the battery charger 10 can automatically provide one of the different constant voltages, 4.1 V and 4.2 V, without the need of a charge control voltage switch between 4.1V and 4.2 V. In other words, the battery charger 10 can cope with a plurality of different types of rechargeable battery packs.

OTHER EMBODIMENTS

As described before, it is necessary to reduce in the current flowing through the resistors R1 and R2 of the voltage divider of the 4.2 V-rechargeable battery pack 20. In the first embodiment of FIG. 1, the relatively high resistance (R1=16.5 kΩ, R2=680 kΩ) is employed to prevent the discharge of the Li-ion battery 201. Another means may be used as will be described hereinafter.

Figure 3:
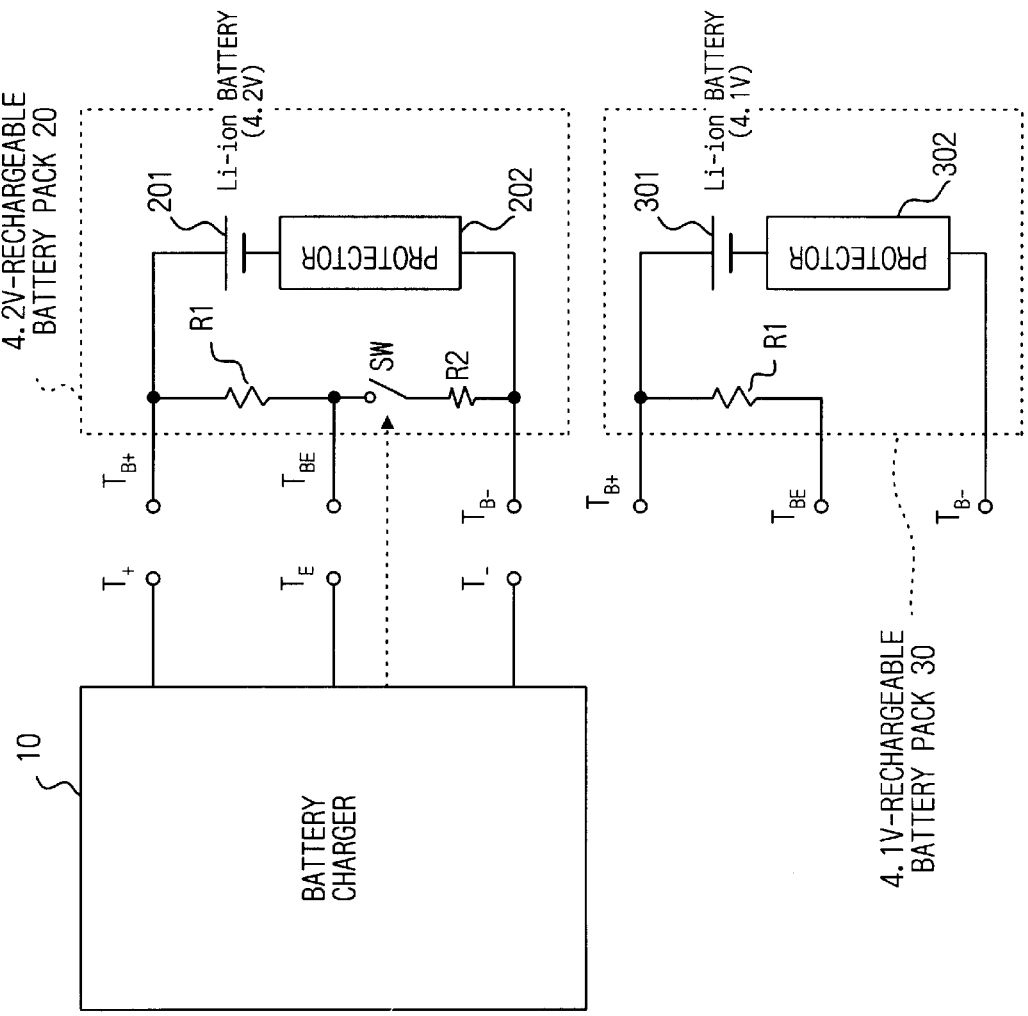
FIG. 3 is a block diagram showing a battery charging system according to a second embodiment of the present invention.

Referring to FIG. 3, the 4.2 V-rechargeable battery pack 20 is further provided with a switch SW connected between the resistors R1 and R2. The switch SW is opened when the 4.2 V rechargeable battery pack 20 is removed from the battery charger 10 and is closed when it is connected to the battery charger 10. Therefore, when the 4.2 V-rechargeable battery pack 20 is removed from the battery charger 10, the both electrodes of the 4.2 V Li-ion battery 201 are perfectly opened.

Such a switch mechanism may be easily implemented. For example, the battery charger 10 is provided with a protrusion at a predetermined location of a connector surface having the terminals $T_+$, $T_E$ and $T_-$. On the other hand, the 4.2 V-rechargeable battery pack 20 is provided with a normally-open switch SW which can be closed by the protrusion of the battery charger 10 when they are connected.

Figure 4:
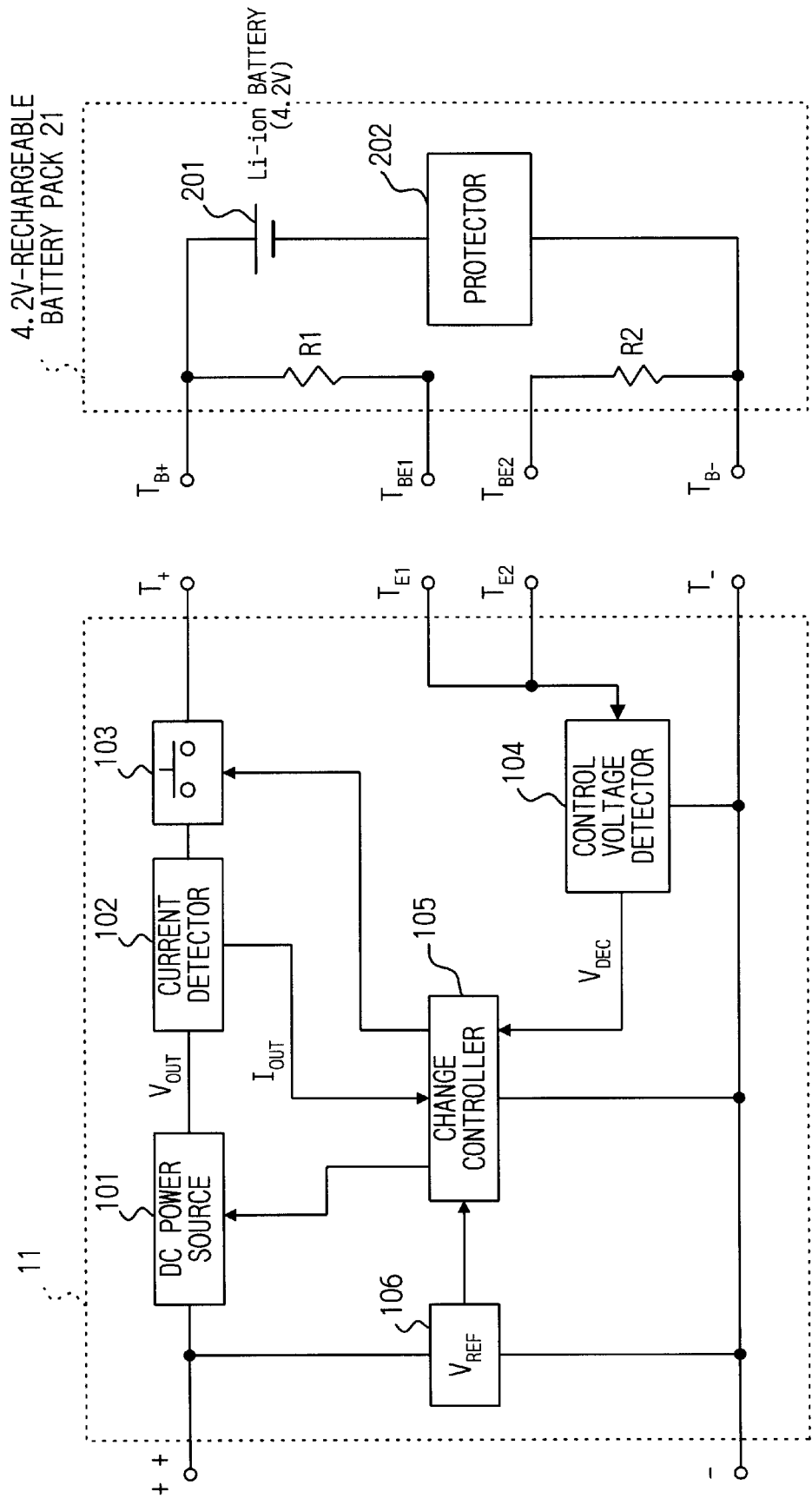
FIG. 4 is a block diagram showing a battery charging system according to a third embodiment of the present invention.

Referring to FIG. 4, a battery charger 11 has the power supply terminals $T_+$ and $T_-$ and two control voltage detection terminals $T_{E1}$ and $T_{E2}$ which are connected to each other therein.

Each of rechargeable battery packs has power receive terminals $T_{B+}$ and $T_{B-}$ and two control voltage supply terminals $T_{BE1}$ and $T_{BE2}$ which correspond to the power supply terminals $T_+$ and $T_-$ and the voltage detection terminals $T_{E1}$ and $T_{E2}$, respectively. A 4.2 V-rechargeable battery pack 21 includes a rechargeable lithium-ion battery 201 of the prescribed charge voltage of 4.2 V. The rechargeable lithium-ion battery 201 is connected to the power receive terminals $T_{B+}$ and $T_{B-}$ through a protector 202. Further, the power receive terminal $T_{B+}$ is connected to the control voltage supply terminal $T_{BE1}$ through a resistor R1 and the power receive terminal $T_{B-}$ is electrically connected to the control voltage supply terminal $T_{BE2}$ through a resistor R2. A 4.1 V-rechargeable battery pack (not shown) is not provided with the resistor R2.

When the 4.2 V-rechargeable battery pack 21 is removed from the battery charger 11, the terminals $T_{BE1}$ and $T_{BE2}$ of the resistors R1 and R2 are opened. When the 4.2 V-rechargeable battery pack 21 is connected to the battery charger 11, the terminals $T_{BE1}$ and $T_{BE2}$ are closed to form the voltage divider as in the case of the 4.2 V-rechargeable battery pack 20 of FIG. 1. Therefore, when the 4.2 V-rechargeable battery pack 21 is removed from the battery charger 10, the both electrodes of the 4.2 V Li-ion battery 201 are perfectly opened.

What is claimed is:

1. A battery charging system comprising a battery charger and a plurality of rechargeable battery packs each having a different predetermined charge voltage, each of the rechargeable battery packs comprising:

a rechargeable battery having a predetermined charge voltage; and a circuit for generating a control voltage depending on a battery voltage of the rechargeable battery so that the control voltage reaches a predetermined control voltage when the battery voltage reaches a predetermined charge voltage of the rechargeable battery, wherein the battery charger charges the rechargeable battery depending on the control voltage received from a rechargeable battery connected thereto.

2. The battery charging system according to claim 1, wherein the predetermined control voltage is set to a common voltage for each rechargeable battery.

3. The battery charging system according to claim 2, wherein the battery charger changes charging control from constant-current to constant-voltage depending on whether the control voltage reaches the predetermined control voltage.

4. The battery charging system according to claim 1, wherein the battery charger changes charging control from constant-current to constant-voltage depending on whether the control voltage reaches the predetermined control voltage.

5. The battery charging system according to claim 1, wherein the circuit is a voltage divider for dividing the battery voltage of the rechargeable battery by a predetermined resistance ratio to produce the control voltage.

6. The battery charging system according to claim 5, wherein each of the rechargeable battery packs further comprises:

an open/close switch for opening the circuit when the rechargeable battery pack is removed from the battery charger and closing the circuit when the rechargeable battery pack is connected to the battery charger.

7. The battery charging system according to claim 6, wherein the open/close switch is included in the voltage divider.

8. The battery charging system according to claim 6, wherein the open/close switch comprises two separate terminals which electrically divides the voltage divider into two parts, wherein the separate terminals are closed when the rechargeable battery pack is connected to the battery charger.

9. The battery charging system according to claim 1, wherein the circuit provides the battery voltage of the rechargeable battery as the control voltage.

10. A rechargeable battery pack comprising:

a rechargeable lithium-ion battery having a predetermined charge voltage; and a circuit for generating a control voltage depending on a battery voltage of the rechargeable lithium-ion battery so that the control voltage reaches a predetermined control voltage when the battery voltage reaches a predetermined charge voltage of the rechargeable battery, wherein the predetermined control voltage is set to a common voltage for another rechargeable battery.

11. The rechargeable battery pack according to claim 10, wherein the circuit is a voltage divider for dividing the battery voltage of the rechargeable battery by a predetermined resistance ratio to produce the control voltage.

12. The rechargeable battery pack according to claim 11, wherein each of the rechargeable battery packs further comprises:

an open/close switch for opening the circuit when the rechargeable battery pack is removed from the battery charger and closing the circuit when the rechargeable battery pack is connected to the battery charger.

13. The rechargeable battery pack according to claim 12, wherein the open/close switch is included in the voltage divider.

14. The rechargeable battery pack according to claim 12, wherein the open/close switch comprises two separate terminals which electrically divides the voltage divider into two parts, wherein the separate terminals are closed when the rechargeable battery pack is connected to the battery charger.

15. The rechargeable battery pack according to claim 10, wherein the circuit provides the battery voltage of the rechargeable battery as the control voltage.

16. A battery charging method for a rechargeable battery pack, comprising the steps of:

a) generating a control voltage depending on a battery voltage of the rechargeable battery so that the control voltage reaches a predetermined control voltage when the battery voltage reaches a predetermined charge voltage of the rechargeable battery; and b) charging the rechargeable battery depending on the control voltage.

17. The battery charging method according to claim 16, wherein the predetermined control voltage is set to a common voltage to another rechargeable battery.

18. The battery charging method according to claim 16, wherein the step b) comprises the step of changing charging control from constant-current to constant-voltage depending on whether the control voltage reaches the predetermined control voltage.

19. The battery charging method according to claim 16, wherein the step a) comprises the step of dividing the battery voltage of the rechargeable battery by a predetermined resistance ratio to produce the control voltage.

20. The battery charging method according to claim 16, wherein the step a) comprises the step of providing the battery voltage of the rechargeable battery as the control voltage.

* * * * *

UNITED STATES PATENT AND TRADEMARK OFFICE
CERTIFICATE OF CORRECTION

PATENT NO. : 5,994,874
DATED : November 30, 1999
INVENTOR(S) : Toshinori Hirose

It is certified that error appears in the above-identified patent and that said Letters Patent is hereby corrected as shown below:

Column 1, Line 3: "COMMON A" should read -- A COMMON--

Column 2, Line 15: "voltage in" should read --voltage. In--

Signed and Sealed this

Second Day of January, 2001

Attest:

Attesting Officer

Q. TODD DICKINSON
Commissioner of Patents and Trademarks